Jan. 31, 1933.   C. E. SUMMERS   1,896,027
METHOD AND MEANS OF COUNTERACTING TORSIONAL VIBRATION
Filed Feb. 20, 1925   3 Sheets-Sheet 2

Inventor
Caleb E. Summers,
By Spencer, Sewall & Hardman
his Attorney

Jan. 31, 1933.　　　　C. E. SUMMERS　　　　1,896,027
METHOD AND MEANS OF COUNTERACTING TORSIONAL VIBRATION
Filed Feb. 20, 1925　　3 Sheets-Sheet 3
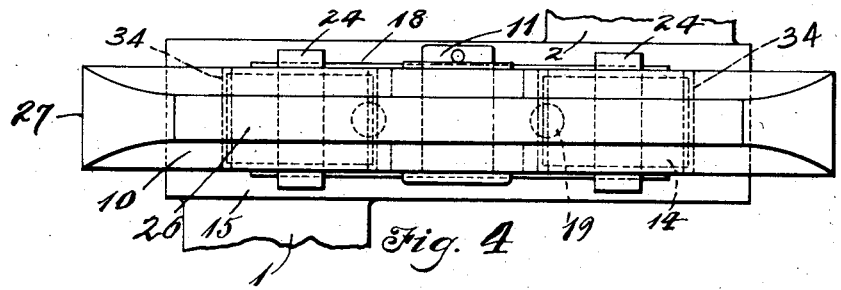
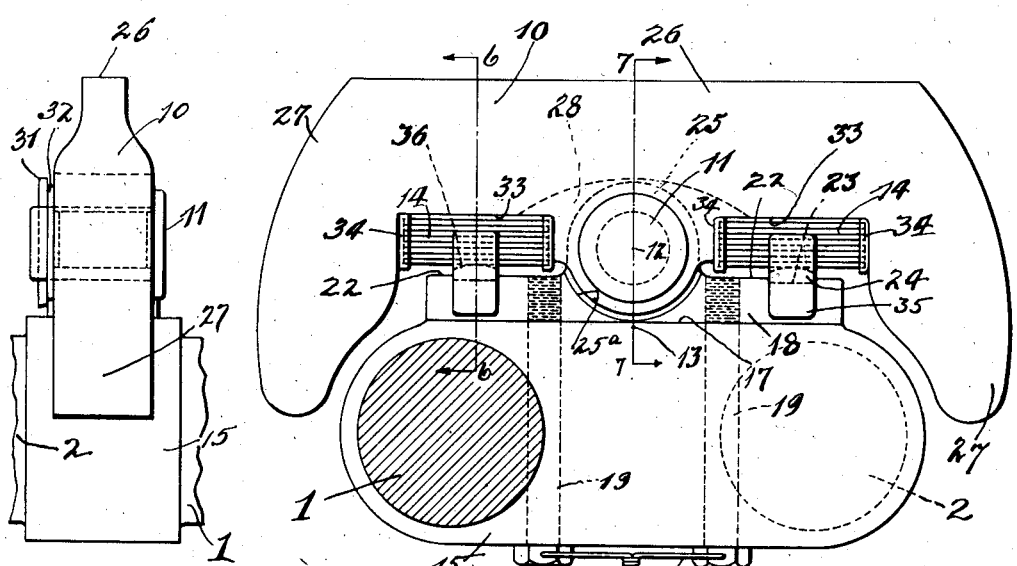
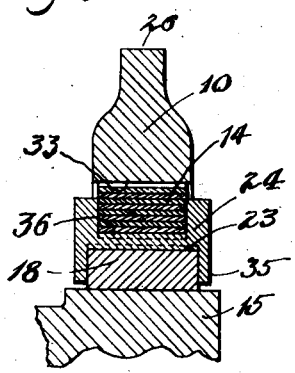
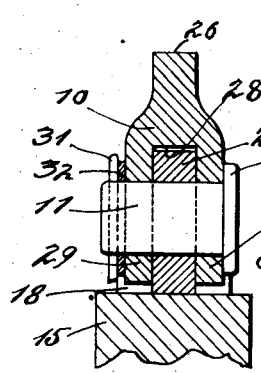
Inventor
Caleb E. Summers,
By Spencer, Sewall & Hardman,
his Attorneys Patented Jan. 31, 1933

1,896,027

UNITED STATES PATENT OFFICE

CALEB E. SUMMERS, OF DAYTON, OHIO, ASSIGNOR, BY MESNE ASSIGNMENTS, TO PACKARD MOTOR CAR COMPANY, OF DETROIT, MICHIGAN, A CORPORATION OF MICHIGAN

METHOD AND MEANS OF COUNTERACTING TORSIONAL VIBRATION

Application filed February 20, 1925. Serial No. 10,640.

This invention appertains to means for preventing or materially reducing vibrations in bodies subject to intermittingly acting forces. It relates particularly to means for neutralizing or counteracting forces tending to excite torsional vibrations in shafting.

In a reciprocating engine, for example, the intermitting turning efforts and inertia forces applied to the cranks of the crank shaft through the pistons and connecting rods cause torsional displacements of one portion of the shaft with respect to another. As the crank shaft is elastic it reacts after cessation of any force that distorted it with a force proportional to the distorting force, so that there is a repeated twisting and untwisting of the shaft during operation. Every shaft has one or more natural frequencies of vibration. If the intermittent exciting forces harmonize with the vibrations of a shaft vibrating according to its natural frequency resonance occurs. In the present day automobile gasoline engine the crank shaft is attached at one end to a fly wheel and has several cranks disposed along it. Such a shaft is in effect a torsional pendulum. It has a fundamental mode of vibration of definite frequency which may be excited by the piston forces of the engine at several engine speeds. It is an object of this invention to oppose the piston forces exerted on a crank shaft at periods of resonance by means of a torsion balancer elastically mounted on the shaft.

It has been illustrated and described in connection with a multi-throw crank shaft such as is usually employed in engines of the automotive type, but it is to be understood that the invention is not limited to use with such crank shafts but may be employed with crank shafts in engines of other and various types.

In the accompanying drawings, which illustrate one application of the invention, and in which like reference characters indicate like parts throughout the several views.

Fig. 3 is a view illustrating a vibratory reaction mass, its position with relation to the axis of the crank shaft and one means of mounting it, viewed in a direction fore-and-aft of the crank shaft;

Fig. 4 is a view of the reaction mass applied to a crank arm, as viewed from above when said crank arm is in a horizontal position;

Fig. 5 is a view of the reaction mass applied to a crank arm as viewed from one side of the crankshaft, toward one end of said crank arm;

Fig. 6 is a section on line 6—6 of Fig. 3; and

Fig. 7 is a section on line 7—7 of Fig. 3.

Figure 1:
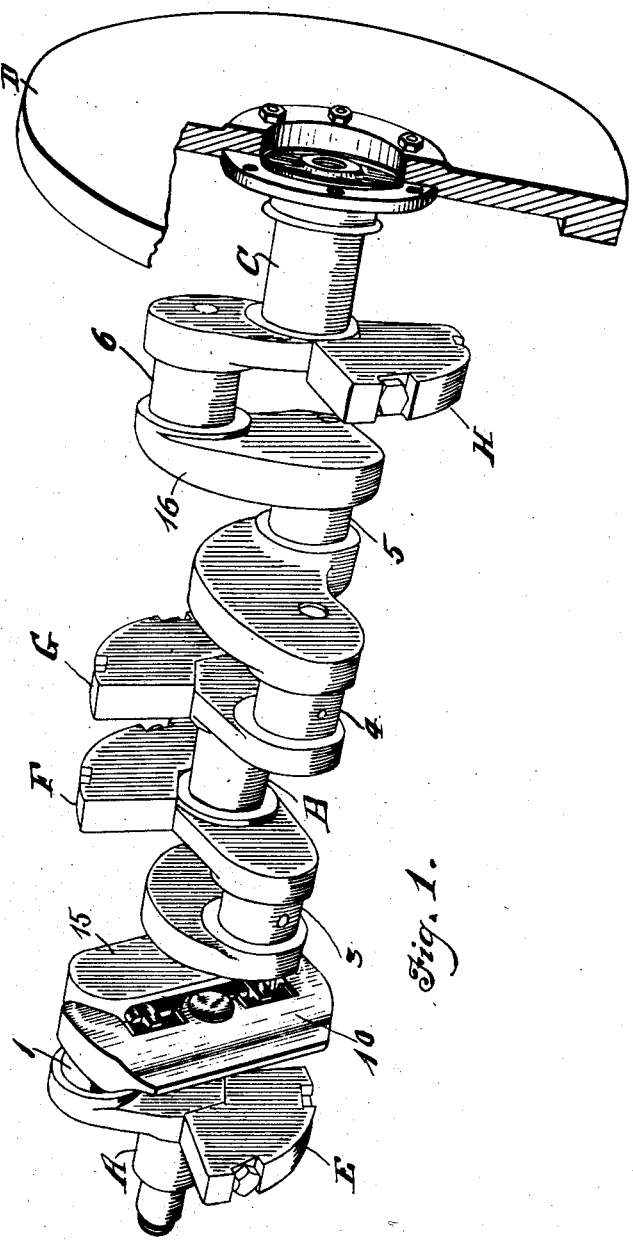
Fig. 1 is a perspective view of a balanced crank shaft of a six-cylinder motor-vehicle engine in which this invention is embodied.
Figure 2:
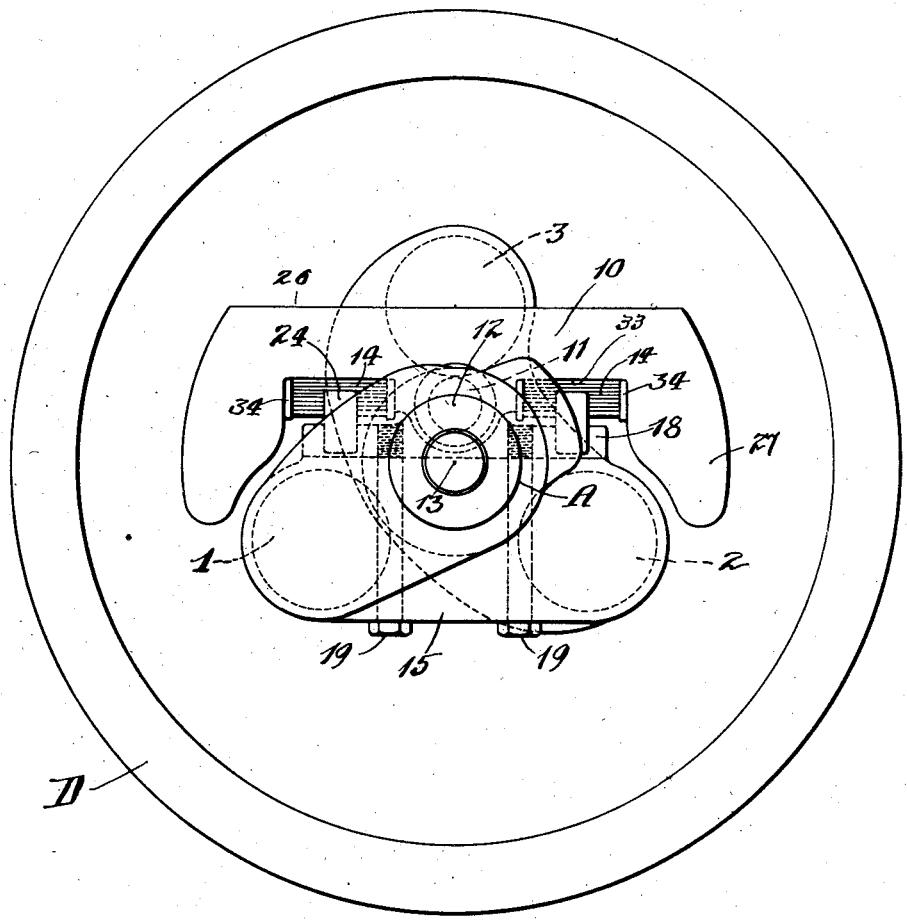
Fig. 2 represents the crank shaft shown in Fig. 1, as it appears looking from the front toward the rear, but with the counterweights appearing in Fig. 1 omitted in order to simplify the illustration.

For the purpose of illustrating one useful embodiment of the invention there is depicted, in Figs. 1 and 2, a six-throw crank shaft having two end journals and one intermediate journal. The crank pins are disposed in two sets of three pins each, one set on each side of the intermediate journal, with the pins of each set angularly spaced around the crankshaft axis 120° apart, the extended axis of corresponding crank pins of each set being coincident. A flywheel constituting a balanced inertia mass, is rigidly secured to the rear or transmission end of the crankshaft. As thus far described, this is the usual disposition of the crank pins and flywheel in six-cylinder internal-combustion engines for motor vehicles. In Fig. 1, A is the front journal of the crank shaft, B the intermediate journal, C the rear journal, and D the flywheel. The crank pins, proceeding from the front end of the crank shaft toward the rear end, are indicated by 1, 2, 3, 4, 5 and 6. The axis of pin 1 is in alinement with the axis of pin 6; that of pin 2 with pin 5; and that of pin 3 with that of pin 4. It is usual to form the pins and crank arms of such mass and to dispose the masses in such relative positions that the crank shaft will be in static balance. As the cranks and pins are off-center masses with respect to the crank shaft axis,—disposed in different transverse planes along the crank shaft,—these off-center masses (with the addition of the large end of the connecting rods) tend to bend the crank shaft or urge it transversely at different portions of its length and impose severe strains upon the bearings of the shaft in the crank case by reason of the centrifugal forces developed when the crank shaft is rotating at usual speeds unless the shaft is counterweighted by masses so proportioned and disposed as to counteract the centrifugal forces of the several cranks and pins (and the large ends of the connecting rods) by substantially equal and oppositely-applied forces. The crank shaft illustrated in Fig. 1 is counterbalanced by the disposition of the masses of the crank arms and by the added counterweights E, F, G, H,—all as thus far described quite according to familiar practice.

The novel and peculiar characteristic of a crank shaft that is constructed according to this invention, resides in the combination therewith of a reaction or balancing mass indicated in the drawings as a weight member 10, the function of which is to counteract the forces that cause torsional displacement or torsional vibrations in the shaft, particularly when these forces are synchronous or in step with the natural vibrations of the shaft considered as a torsion pendulum. The reaction mass, shown as a bar 10, may vibrate in a plane transverse of the shaft. In the particular embodiment shown, it is pivotally mounted midway of its ends on one of the crank arms, as 15, remote from the flywheel, by a pin or pintle, having an axis parallel with but laterally displaced with respect to the axis of the crank shaft. With the mass so pivoted it is balanced on its pivot,—the mass being equally distributed on opposite sides of a plane that includes the axes of the shaft and the pivot. Stiff, highly-resilient and quick-acting springs are interposed between the reaction bar 10 and the crank arm. With the reaction bar in place the crank arm is in static balance, nor does its presence disturb the dynamic balance of the shaft effected by the distribution of the crank masses and counterweights. It is not essential to efficient functioning of the bar 10 that it be mounted as described, although the means of connection shown is preferred. The bar may be mounted in various ways so long as it is capable of vibrating or reciprocating so as to impress the forces of its vibrations or reciprocations transversely of the shaft and its relativity of movement is resisted by stiff and lively springs. In the usual construction of a six-throw motor-vehicle engine crank shaft, without the reaction bar 10, the crank arm 15 near the front of the shaft upon which the reaction bar is mounted would be formed so that its mass would be equal to that of the corresponding crank arm 16 near the rear end of the shaft and would be similarly distributed. Therefore, a crank shaft adapted to receive the reaction bar shown would have the crank arm 15 made somewhat differently than the crank arm 16 and its mass so disposed that it, together with so much of the reaction bar 10 as is off-center with respect to the crank shaft and not counterbalanced by other portions of its mass, would equal in balancing effect the crank arm 16. Thus, a crank shaft having the reaction bar attached as shown would be substantially in balance; and the main body of the crank shaft illustrated, with attached counterweights and flywheel, is intended to be so designed that it is in balance when the reaction bar 10 is attached.

The crank arm 15, to which the reaction mass is attached, may be of any suitable form. In the embodiment shown the side or surface 17 is made plane. To the plane surface 17 a hinge or bearing bracket 18 is bolted by means of headed bolts 19 passed through holes in the crank arm and screwed into threaded holes in the bracket, thus securing the bracket rigidly to the crank. The bolts 19 may be prevented from loosening by any desired bolt lock, such as wire 20 passed through small holes in the bolt heads and having its ends twisted or otherwise secured together as at 21. The faces 22 on the end portions of bracket 18 may be provided with transverse seats 23 to receive saddles 24 which constitute spring abutments, to be presently further described, while between the seats, the bracket 18 is provided with a relatively thin hinge member 25, elevated from the body of the bracket and milled upon opposite faces, as by an end mill, so as to form curved bottom walls 25a, upon each side of the bracket, from which the hinge member 25 rises.

The reaction bar 10 may be of relatively small mass. It may have a straight outer edge 26 and may be thinner adjacent the outer edge than elsewhere; the form, in short, may be such that material may be readily planed or milled from its outer edge or sides, in machining them for quantity production. The end portions 27 of the bar 10 may be formed so as to symmetrically overhang the axis 13 of the crank shaft in the event that greater mass is found to be needed or desirable in said bar than the mass necessary to bring the balance of crank 15 and said bar to an equality with crank 16. These overhanging ends 27 being opposite, equal in size, and symmetrically disposed with respect to the crankshaft axis 13, will not affect the balance of the crankshaft. In order to accommodate the hinge member 25 of the bracket 18 to mating hinge members on the reaction bar 10, the center of the latter has a milled groove 28 into which the hinge member 25 fits nicely. The side walls 29 left by the groove 28 constitute the hinge members on the reaction bar 10 that mate with the hinge member 28. Said members 29 preferably are formed with parallel, curved side projections that approach the curved bottom walls 25a of the bracket 18. Registering holes for the pintle or pivot pin 11 extend through the hinge members 28 and 29. The pivot pin 11 may have a head 30 and a hole in its end to receive a cotter pin 31 when the pivot pin 11 is in place. A washer 32 may be interposed between the cotter pin and the adjoining face of one of the hinge members 29 of the reaction bar.

Two preferably rectangular recesses 33 may be formed in the reaction bar 10, one on each side of its pivot pin 11. These recesses are for the purpose of accommodating the stiff, quick-acting springs 14 interposed between the bar 10 and the crank 15 of the crankshaft. Each spring unit 14 may consist of a plurality of flat leaves of spring steel, or other suitable highly-resilient flat strips, the ends of which are seated in shallow cups 34. Each saddle or spring abutment 24 is preferably formed with two limbs 35 that are spaced apart a distance equal to the width of the ends of and embrace the sides of bracket 18. The abutments 24 fit snugly in the seats 23. There is also formed in the opposite side of each spring abutment 24 a rectangular recess of a width to accommodate with nicety and embrace the springs 14, thus restraining movement of the spring leaves edgewise. The bottom of each recess is rounded as indicated at 36 (see Fig. 3). When the springs and spring abutments are assembled with the reaction bar on the crankshaft, the middle of each spring unit bears (flatwise of the leaves) upon the rounded seat 36 and its ends are confined by the encircling flanges of the cups 34 within the recess 33 of the bar 10. The flanges of cups 34 serve as seats or abutments for the ends of the springs and space the spring unit from the bottom wall of the recess 33 by the thickness of the flange which is about the thickness of one spring leaf. There is thus provided space for flexing of the spring units should the bar 10 be subjected to forces sufficient to overcome the elastic set of the springs. The separate spring leaves when assembled cannot move laterally with respect to each other because the encircling flanges of the spring cups 34 prevent such movement, while the spring abutment 24 prevents a lateral movement with respect to the bracket 18. The assembled elements retain their positions without screws or other fastenings that are inconvenient to unfasten and that may work loose because of vibration. The pintle or pivot pin 11 retains the entire assembly of bracket 18, reaction bar 10, springs and spring abutments, so that they cannot come apart. When the pintle pin 11 is removed, the saddle 24 may be lifted from the bracket 18, but cannot be moved in a plane parallel with the springs.

Springs 14 are intended to be strong, stiff and highly resilient so as to react quickly and energetically. The mass of the reaction bar and the stiffness and resilience of the springs are so proportioned that the bar will oscillate substantially at shaft frequency, when set in motion by a twisting movement of the shaft, such as occurs when the piston thrusts come in step with the natural vibrations of the shaft.

When the crankshaft is rotating at other than the critical speeds, that is, at those speeds at which the rotations imparted to the shaft by the intermittent impulses of the pistons and connecting rods are out of phase with the vibrations of the shaft in accordance with its natural rate or frequency, the oscillations are of such small amplitude as to be negligible. When the shaft attains such a speed that the intermittent impulses of the pistons and connecting rods are in phase and harmonize with the vibrations of the shaft, occurring at its natural rate, the amplitude of the vibrations greatly increases. As soon as the vibrations of relatively great amplitude begin they induce vibrations in the reaction bar. By the first excessive twist of the crankshaft in one direction one spring abutment 24 is caused to press violently against one of the spring units 14. This impulse imparts movement to the bar such as to cause the other spring unit to press upon the other abutment 24 and be flexed. The vigorous reaction of the last-mentioned spring causes the reaction bar to oscillate in the opposite direction and the first-mentioned spring to press sharply on the abutment, and so on. The bar 10 is so proportioned and designed that its vibrations lag with respect to those of the shaft to such a degree that it vibrates at substantially the same frequency but out of phase with the crankshaft thus opposing the exciting forces. The small quantity of friction incident to the pin pivotal connection of the balancer or the action mass and the use of leaf springs tends to restrain its freedom of vibration, thus rendering it effective over a broader speed range and less likely to react so violently as to impress other vibrations on the shaft than if the movements of the balancer were according to a theoretically unrestrained elastic system with two degrees of freedom.

In compliance with the provisions of the statute the principle involved in this invention has been explained, and one particular preferred embodiment has been illustrated and described. But the scope of the invention is not intended to be limited to the particular concrete embodiment described and illustrated for the purpose of disclosing to others the best way in which it has been contemplated applying the principle and utilizing the invention.

What is claimed is as follows:

1. A resilient shaft, susceptible of vibrating torsionally, a member movable transversely with respect to the shaft, and leaf springs interposed between the shaft and member; said member and the spring connection between it and the shaft being so proportioned with respect to weight, distribution of mass and degree of resiliency, that the frequency of vibration of the member is substantially the same as that of the shaft, when set in vibration by the latter.

2. The combination of two members, comprising a shaft of resilient material susceptible of vibrating torsionally, and a reaction mass mounted on the shaft and movable in a plane transverse of the shaft; leaf springs tending to retain said mass stationary with respect to said shaft; abutments on one of said members for the ends of the springs; saddles seated on the other member, free to be lifted therefrom, but restrained from movement in a plane parallel with the plane of the springs, said saddles having abutments bearing on the springs between their ends and members embracing the edges of the springs.

3. The combination of two members comprising a shaft of resilient material, susceptible of vibrating torsionally, and a reaction mass mounted on said shaft in such manner as to be capable of limited movement in a plane transverse of the shaft; means of high resiliency resisting the movement of said mass with respect to the shaft, said means of high resiliency comprising a spring unit composed of a plurality of leaves, abutments on one member for the ends of the spring unit consisting of cups in which the leaves of the spring are seated and confined so that they remain in assembled relation, and an intermediate abutment on the other member bearing upon the spring between its ends.

4. The combination of two members comprising a shaft of resilient material, susceptible of vibrating torsionally, and a reaction mass mounted on said shaft in such manner as to be capable of limited movement in a plane transverse of the shaft; means of high resiliency resisting the movement of said mass with respect to the shaft, said means of high resiliency comprising a spring unit composed of a plurality of leaves, abutments on one member for the ends of the spring and an intermediate abutment on the other member removably seated and connected with the spring unit so that the abutment and spring unit mutually retain each other in operative position.

5. The combinaion of two members comprising a shaft of resilient material susceptible of vibrating torsionally and a reaction mass mounted on the shaft and movable in a plane transverse of the shaft, one of said members having a recess; a spring unit comprising a plurality of leaves; cups serving as end abutments for the spring unit, said spring unit and cups occupying said recess; and an intermediate spring abutment removably seated on the other member and held against said member by the pressure of the spring unit.

6. The combination of a shaft of resilient material, with a reaction mass pivoted to the shaft on an axis parallel with but displaced with respect to the axis of the shaft, and means of high resiliency resisting vibratory movement of said mass, said mass and means of high resiliency being so proportioned and related that vibrations of the mass induced by vibrations of the shaft will be of substantially the same frequency but out of phase relation with respect to the vibrations of the shaft.

7. The combination of a crank shaft of resilient material susceptible of vibrating torsionally, with a reaction mass mounted thereon and movable relatively to the shaft about an axis parallel with the axis of the shaft, resilient means opposing movement of the mass with respect to the shaft, the mass and resilient means being so proportioned that torsional vibrations of the shaft will induce vibrations of substantially the same frequency in the mass; and said shaft with mass attached being in static balance.

8. The combination of a crank shaft of resilient material susceptible of vibrating torsionally, with a reaction mass of bar-like form mounted thereon and movable relatively to the shaft about an axis parallel with the axis of the shaft; resilient means opposing relative movements of the mass with respect to the shaft, the mass and resilient means being so proportioned that torsional vibrations of the shaft will induce vibrations of substantially the same frequency in the mass; and said shaft with mass attached being in static balance.

9. The combination of a crank shaft of resilient material susceptible of vibrating torsionally, with a reaction mass of bar-like form pivoted adjacent one edge to the shaft and having symmetrical enlarged end portions projecting from the side adjacent the shaft, and springs on each side of the pivot exerting their elastic force between the mass and the shaft, the mass and springs being so proportioned that torsional vibrations of the shaft will induce vibrations of substantially the same frequency in the mass.

10. The combination of a crank shaft of resilient material susceptible of vibrating torsionally, with a reaction mass mounted on one of the cranks of said shaft and relatively movable transversely thereof, and resilient means resisting movement of said mass; said mass and resilient means having a vibration frequency substantially the same as that of the shaft.

11. The combination of a crank shaft of resilient material susceptible of vibrating torsionally, with a reaction mass pivoted on one of the cranks on an axis parallel with the shaft axis, and resilient means resisting movement of said mass; said mass and resilient means having a vibration frequency substantially the same as that of the shaft.

12. The combination of a crank shaft of resilient material having a plurality of cranks and pins two of which are in line on the same side of the crank shaft, with a reaction mass mounted on one of the crank arms and relatively movable transversely of the shaft, the balancing effect of the crank and reaction mass being the same as the balancing effect of the other crank in line therewith, and resilient means resisting movement of said mass; said mass and resilient means having a vibration frequency substantially the same as that of the shaft.

13. The combination of a crank shaft of resilient material, susceptible of vibrating torsionally with a reaction mass of bar-like form pivoted on one of the cranks, and springs at opposite sides of the pivots exerting their elastic forces between the bar-like mass and the crank, said mass and springs having a vibration frequency substantially the same as that of the shaft when set in vibration by the latter.

14. The combination of a crank shaft of resilient material having a plurality of cranks and crank pins arranged in pairs, the two crank pins of a pair having a common axial line, a reaction bar mounted on one of said cranks for vibrational movement with respect to the shaft, the off-center mass of the crank and reaction bar mounted thereon being substantially equal in balancing effect to the other corresponding crank of the pair; means resisting movement of the mass of such resiliency as to compel the mass to vibrate at a frequency substantially the same as that of the shaft when the latter vibrates, and a balanced inertia mass rigidly secured to said shaft.

15. The combination of a shaft of resilient material, a weight member pivoted thereto on an axis parallel with but displaced from the shaft axis, and resilient means resisting pivotal movement of said member about its axis.

16. The combination of a shaft of resilient material, with a reaction mass mounted thereon and movable relatively thereto about an axis parallel to but displaced from the shaft axis, and resilient means connecting said mass and shaft to oppose movement of the mass with respect to the shaft.

17. The combination of a crank shaft of resilient material, with a reaction mass pivotally mounted on an axis removed from the shaft axis, resilient means carried by said mass and engaging the shaft to oppose relative movement therebetween, said shaft and mass being in static balance.

18. The combination of a crank shaft of resilient material, with a reaction mass pivotally mounted on a crank arm of said shaft and relatively movable transversely thereof, and resilient means resisting movement of the mass.

19. The combination of a crank shaft having a crank arm, a balancing mass pivotally mounted on said arm, said crank shaft and mass being in static and dynamic balance, and yielding means connecting said shaft and mass permitting limited relative movement therebetween.

20. The combination of a crank shaft having a crank arm, with a balancing mass mounted on said arm in such manner as to be capable of limited movement in the plane of rotation thereof, and means of high resiliency resisting such movement comprising opposed springs connected between the mass and the shaft.

21. The combination of a crank shaft having a crank arm, and a mass pivotally mounted on said crank arm and movable relatively to said crank arm during operation of the crank shaft in response to vibratory movement of the crank shaft.

22. The combination of a crank shaft having a crank arm, and a weight member carried by said crank arm and movable relatively to the crank shaft during operation thereof in response to vibratory movement of the crank shaft.

23. The combination with a crank shaft having a crank arm, of means mounted on said crank arm for vibratory movement with respect thereto in response to and at substantially the frequency of vibration of the crank shaft.

24. The combination of a crank shaft of resilient material, with a reaction mass pivotally mounted on a crank of said shaft and relatively movable transversely thereof, and resilient means resisting movement of the mass, said mass and resilient means being so proportioned that torsional vibrations of the shaft will induce vibrations of substantially the same frequency in the mass.

25. In a damper for crankshafts, a base plate secured to the shaft, an ear on said plate, recesses at opposite sides of said ear, a weight member, a yoke on said weight member straddling said ear and fitting in said recesses, and a pin for securing said yoke to said ear.

26. The combination of a shaft of resilient material, with a reaction mass mounted thereon and movable relatively thereto about an axis parallel to but displaced from the shaft axis, and resilient means connecting said mass and shaft to oppose movement of the mass with respect to the shaft, said resilient means engaging said mass on opposite sides of the axis of said mass.

27. The combination of a shaft of resilient material, a weight member pivoted thereto on an axis parallel with but displaced from the shaft axis, and resilient means resisting pivotal movement of said member about its axis, said resilient means comprising springs exerting thrust between said shaft and mass at spaced points, the lines of thrust passing on opposite sides of the axis of said mass.

28. The combination of a crank shaft having a crank arm, and a weight member carried by said crank arm and movable relatively to the crank shaft during operation thereof in response to vibratory movement of the crank shaft, and springs interposed between said crank arm and said mass for resisting pivotal movement of the latter, said springs being disposed on opposite sides of the axis of said mass.

In testimony whereof I hereto affix my signature.

CALEB E. SUMMERS.